United States Patent
Kanayama et al.

(10) Patent No.: US 10,182,306 B2
(45) Date of Patent: Jan. 15, 2019

(54) DEVICE AND METHOD FOR DETERMINING DISPOSITION OF A PLURALITY OF RADIO APPARATUSES

(71) Applicant: KABUSHIKI KAISHA TOSHIBA, Minato-ku, Tokyo (JP)

(72) Inventors: Fumiaki Kanayama, Kawasaki Kanagawa (JP); Yusuke Doi, Kawasaki Kanagawa (JP); Takafumi Sakamoto, Machida Tokyo (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 0 days.

(21) Appl. No.: 15/225,534

(22) Filed: Aug. 1, 2016

(65) Prior Publication Data

US 2017/0041740 A1 Feb. 9, 2017

(30) Foreign Application Priority Data

Aug. 4, 2015 (JP) .................. 2015-154583

(51) Int. Cl.
*H04W 4/02* (2018.01)
*H04B 17/318* (2015.01)

(52) U.S. Cl.
CPC ............ *H04W 4/02* (2013.01); *H04B 17/318* (2015.01)

(58) Field of Classification Search
CPC ....... H04W 4/02; H04W 4/021; H04W 4/023; H04W 4/027; H04W 4/028; H04W 4/04; H04W 4/022; H04W 64/00; H04W 64/003; H04W 64/006; H04W 4/046; H04W 40/38; H04W 84/18; H04W 84/20; H04W 84/22; H04W 4/025; H04W 4/043; H04W 88/00;

(Continued)

(56) References Cited

U.S. PATENT DOCUMENTS 7,313,405 B2 * 12/2007 Tanabe .............. H04M 1/72536
455/456.2
7,737,861 B2 * 6/2010 Lea ......................... G01S 13/75
340/10.1

(Continued)

FOREIGN PATENT DOCUMENTS

JP 2006090868 A 4/2006
JP 2010112869 A 5/2010

(Continued)

*Primary Examiner* — Meless Zewdu
(74) *Attorney, Agent, or Firm* — Holtz, Holtz & Volek PC

(57) ABSTRACT

According to an embodiment of the present invention, a radio-apparatus-disposition estimation device includes a processor configured to execute a program to provide at least: a first acquirer, a second acquirer, and a calculator. The first acquirer acquires first information concerning communication among a respective plurality of radio apparatuses or radio waves transmitted and received among the respective plurality of radio apparatuses. The second acquirer acquires setting position candidates of the plurality of radio apparatuses. The calculator calculates, on the basis of the first information and the setting position candidates, one or a plurality of estimated patterns in which setting positions of the radio apparatuses are identified as different ones of the setting position candidates.

12 Claims, 8 Drawing Sheets

(58) Field of Classification Search
CPC .... H04W 88/02; H04W 88/08; H04B 17/318; H04B 1/034; G01S 1/68
See application file for complete search history.

(56) References Cited

U.S. PATENT DOCUMENTS

| | | | | |
|---|---|---|---|---|
| 8,606,293 B2 * | 12/2013 | Kim | | G06Q 30/0261 |
| | | | | 455/456.1 |
| 8,626,188 B2 * | 1/2014 | Cho | | H04W 64/00 |
| | | | | 455/456.1 |
| 8,700,053 B2 * | 4/2014 | Alizadeh-Shabdiz | | |
| | | | | G01S 5/0278 |
| | | | | 455/456.1 |
| 8,923,764 B2 * | 12/2014 | Urushiyama | | H04W 48/16 |
| | | | | 455/41.2 |
| 9,648,482 B2 * | 5/2017 | Cooper | | H04W 8/005 |
| 9,706,515 B1 * | 7/2017 | Chadwick | | H04W 64/00 |
| 9,723,510 B1 * | 8/2017 | Beluri | | H04W 24/10 |
| 2007/0241864 A1 * | 10/2007 | Nagai | | G06K 7/0008 |
| | | | | 340/10.1 |
| 2007/0296633 A1 * | 12/2007 | Yanagihara | | G01S 5/0009 |
| | | | | 342/463 |
| 2008/0204321 A1 * | 8/2008 | Yanagihara | | G01S 5/0284 |
| | | | | 342/450 |
| 2009/0278849 A1 * | 11/2009 | Williams | | G06T 11/206 |
| | | | | 345/441 |
| 2010/0056178 A1 * | 3/2010 | Kreher | | G01S 5/0252 |
| | | | | 455/456.1 |
| 2010/0246485 A1 * | 9/2010 | Potkonjak | | H04W 64/00 |
| | | | | 370/328 |
| 2011/0250904 A1 * | 10/2011 | Valletta | | G01S 5/0252 |
| | | | | 455/456.1 |
| 2013/0184012 A1 * | 7/2013 | Gupta | | H04W 64/00 |
| | | | | 455/456.6 |
| 2013/0273936 A1 | 10/2013 | Hibara et al. | | |
| 2014/0003195 A1 * | 1/2014 | Vonog | | H04B 7/26 |
| | | | | 367/129 |
| 2015/0177361 A1 * | 6/2015 | Otomo | | H04W 4/023 |
| | | | | 455/456.1 |
| 2015/0188766 A1 * | 7/2015 | Song | | G06F 3/1446 |
| | | | | 709/205 |
| 2015/0245321 A1 * | 8/2015 | Jiang | | H04W 4/023 |
| | | | | 370/329 |
| 2015/0373701 A1 * | 12/2015 | Furuichi | | H04W 16/32 |
| | | | | 370/329 |
| 2016/0080486 A1 * | 3/2016 | Ram | | H04W 4/023 |
| | | | | 709/205 |
| 2016/0205746 A1 * | 7/2016 | Kumar | | H05B 37/0227 |
| | | | | 315/297 |

FOREIGN PATENT DOCUMENTS

| | | |
|---|---|---|
| JP | 2010190629 A | 9/2010 |
| JP | 2010204028 A | 9/2010 |
| JP | 2011065837 A | 3/2011 |
| JP | 2011099753 A | 5/2011 |
| JP | 2011158411 A | 8/2011 |
| JP | 2011185646 A | 9/2011 |
| JP | 2014003381 A | 1/2014 |
| WO | 2011055718 A1 | 5/2011 |
| WO | 2012104983 A1 | 8/2012 |

* cited by examiner

| TRANSMISSION \ RECEPTION | 2A | 2B | 2C |
|---|---|---|---|
| 2A | N/A | $W_{ab}$ | $W_{ac}$ |
| 2B | $W_{ba}$ | N/A | $W_{bc}$ |
| 2C | $W_{ca}$ | $W_{cb}$ | N/A |

FIG.4A

| HYPOTHETICAL PATTERN | (3A, 3B, 3C) | DISCRIMINATION CONDITION (EXAMPLE) |
|---|---|---|
| 1 | (2A, 2B, 2C) | $W_{ab} < W_{ac}$<br>$W_{ab} \approx W_{bc}$ |
| 2 | (2A, 2C, 2B) | $W_{ac} < W_{ab}$<br>$W_{ac} \approx W_{bc}$ |
| 3 | (2B, 2A, 2C) | $W_{ab} < W_{bc}$<br>$W_{ab} \approx W_{ac}$ |
| 4 | (2B, 2C, 2A) | $W_{ac} < W_{ab}$<br>$W_{ac} \approx W_{bc}$ |
| 5 | (2C, 2A, 2B) | $W_{ab} < W_{ac}$<br>$W_{ab} \approx W_{ac}$ |
| 6 | (2C, 2B, 2A) | $W_{ab} < W_{ac}$<br>$W_{ab} \approx W_{bc}$ |

FIG.4B

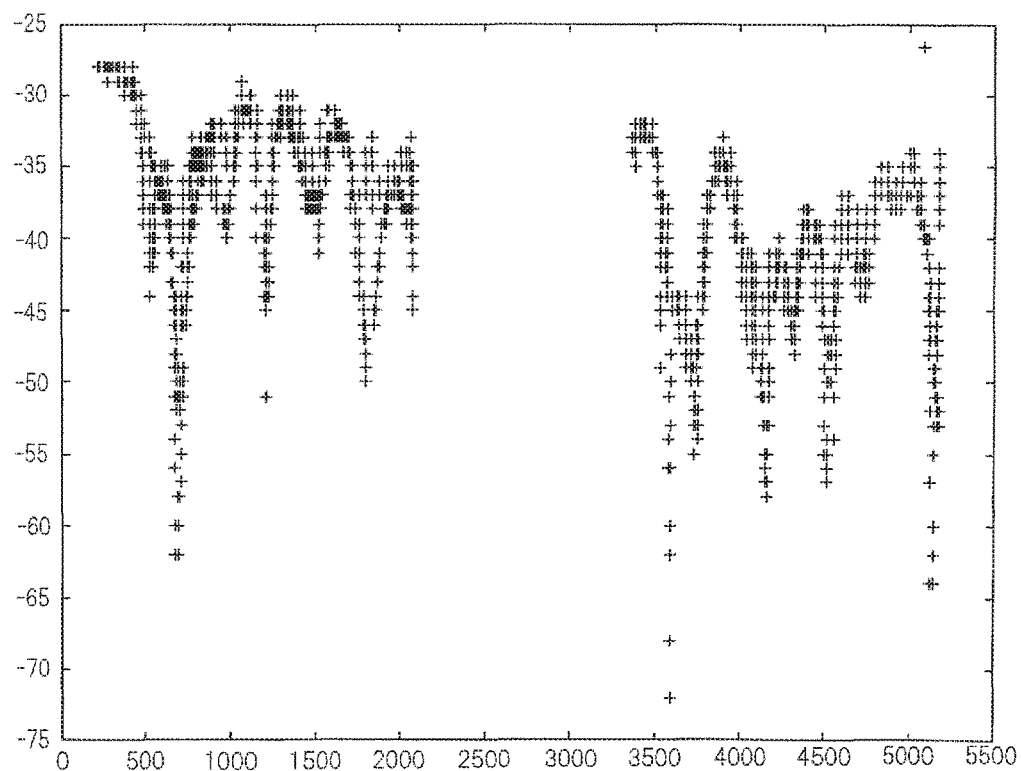
F I G. 5A
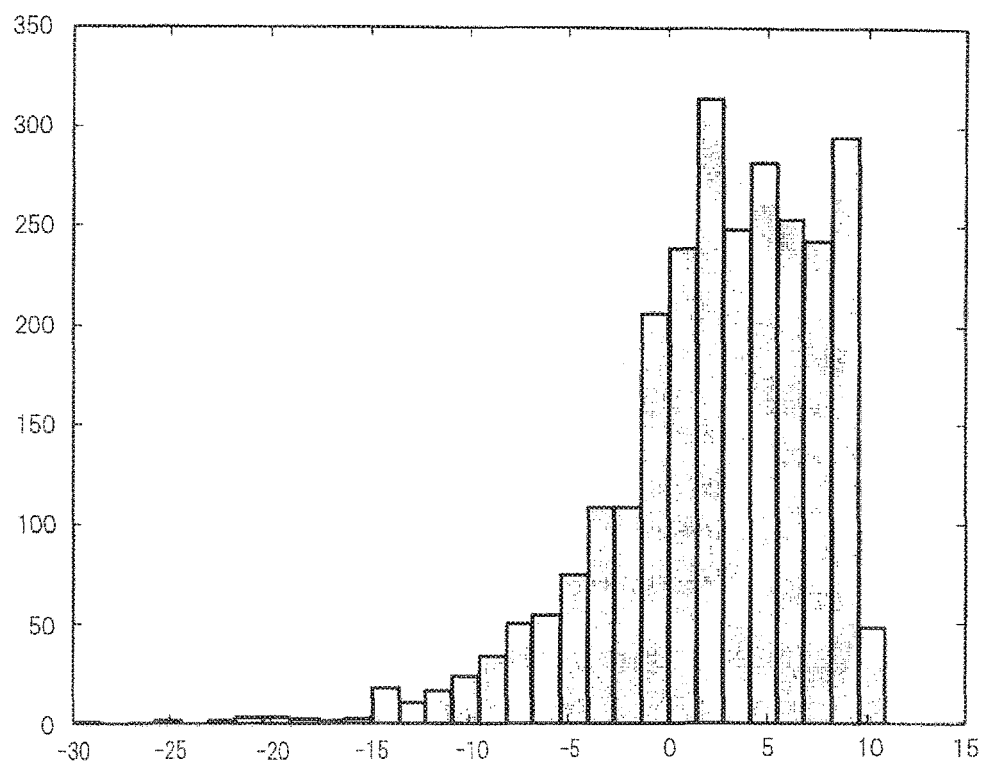
F I G. 5B

DEVICE AND METHOD FOR DETERMINING DISPOSITION OF A PLURALITY OF RADIO APPARATUSES

CROSS-REFERENCE TO RELATED APPLICATION(S)

This application is based upon and claims the benefit of priority from Japanese Patent Application No. 2015-154583, filed Aug. 4, 2015; the entire contents of which are incorporated herein by reference.

FIELD

An embodiment relates to a radio-apparatus-disposition estimation device, an estimation method, and a non-transitory computer readable medium.

BACKGROUND

According to the development of the radio technique in recent years, a large number of techniques for estimating a position of a radio apparatus not incorporating a GPS function have been revealed. These techniques forces another radio apparatus to receive a radio wave, a communication packet, or the like transmitted from one radio apparatus, estimates a distance and a relative positional relation between the two radio apparatuses according to the strength and the direction of the received radio wave, an arrival time of the communication packet, or the like, and calculates a position of the other radio apparatus from positional information of the one radio apparatus.

These conventional techniques for estimating the position are based on the premise that the position of at least one radio apparatus has been identified. Therefore, even if a plurality of positions where a plurality of radio apparatuses are set are grasped from a working drawing or the like of a facility, when none of positions where the radio apparatuses are set is identified or when information concerning disposition is unreliable, the conventional techniques cannot be applied. In these cases, it is necessary to grasp the position of at least one radio apparatus, for example, by a visual inspection.

BRIEF DESCRIPTION OF THE DRAWINGS

FIGS. 4A and 4B are diagrams showing another example of the disposition estimation;

FIGS. 5A and 5B are diagrams showing an example of a method of calculating a random value X;

DETAILED DESCRIPTION

According to an embodiment of the present invention, a radio-apparatus-disposition estimation device includes a processor configured to execute a program to provide at least: a first acquirer, a second acquirer, and a calculator. The first acquirer acquires first information concerning communication among a respective plurality of radio apparatuses or radio waves transmitted and received among the respective plurality of radio apparatuses. The second acquirer acquires setting position candidates of the plurality of radio apparatuses. The calculator calculates, on the basis of the first information and the setting position candidates, one or a plurality of estimated patterns in which setting positions of the radio apparatuses are identified as different ones of the setting position candidates.

Below, a description is given of an embodiment of the present invention with reference to the drawings. The present invention is not limited to the embodiment.

(One Embodiment of the Present Invention)

Figure 1:
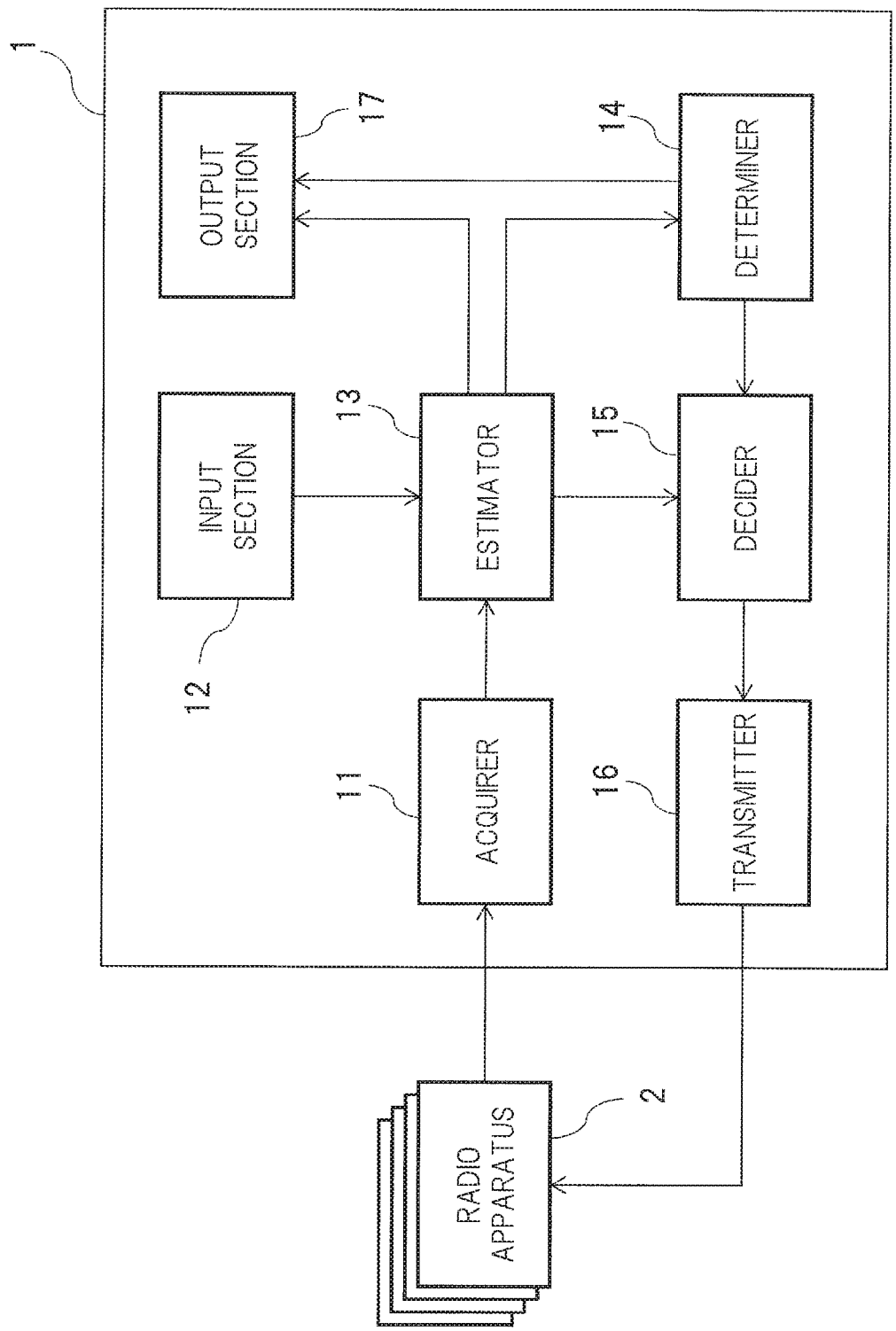
FIG. 1 is a block diagram showing an example of the schematic configuration of a radio-apparatus-disposition estimation device according to an embodiment of the present invention.

FIG. 1 is a block diagram showing an example of the schematic configuration of a radio-apparatus-disposition estimation device according to an embodiment of the present invention. A radio-apparatus-disposition estimation device 1 according to the embodiment of the present invention includes an acquirer 11, an input section (a second acquirer) 12, an estimator (a calculator) 13, a determiner 14, a decider 15, a transmitter 16, and an output section 17. The radio-apparatus-disposition estimation device 1 is connected to a plurality of radio apparatuses 2 via a not-shown communication network. Exchange of data between the radio-apparatus-disposition estimation device 1 and the radio apparatuses 2 are performed via the communication network. The communication network may be a wired network, a wireless network, or a hybrid network of the wired network and the wireless network.

The radio-apparatus-disposition estimation device 1 estimates disposition of the radio apparatuses 2 on the basis of information directly or indirectly acquired from the radio apparatuses 2 and candidates of setting positions input from a user, another system, or the like.

Figures 2A, 2B:
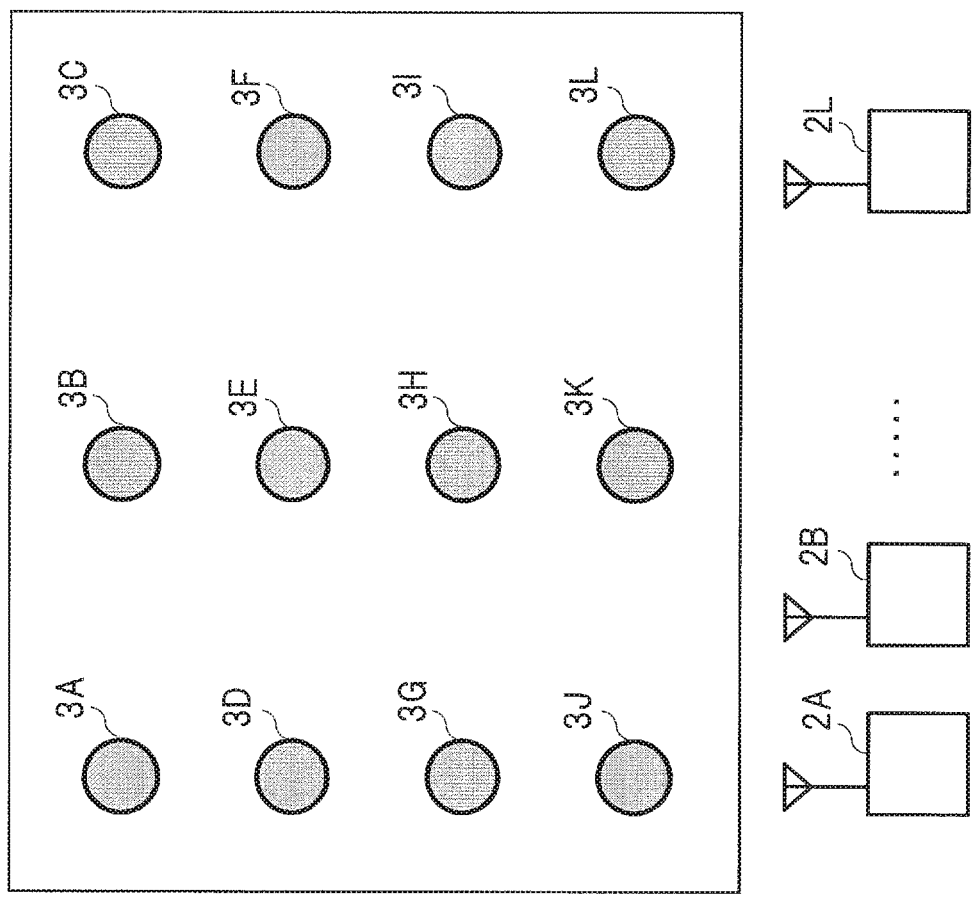
FIGS. 2A and 2B are diagrams showing an example of setting position candidates.

FIGS. 2A and 2B are diagrams showing an example of setting position candidates. A plurality of setting position candidates (3A to 3L) are indicated by gray circles in a square frame shown in FIG. 2A. The radio apparatuses 2 (2A to 2L) are set in the setting position candidates. However, it is unknown which of the radio apparatuses 2 are set in which of the setting position candidates. That is, the radio-apparatus-disposition estimation device 1 estimates combinations of the radio apparatuses 2 and the setting position candidates. Disposition patterns formed by the estimated combinations of the radio apparatuses 2 and the setting position candidates are referred to as estimated patterns or estimation results. Assumable disposition patterns are referred to as hypothetical patterns. FIG. 2B is a diagram showing an example of the hypothetical patterns. The radio-apparatus-disposition estimation device 1 may narrow down the estimated patterns from all the hypothetical patterns or may estimates combinations of the radio apparatuses 2 and the setting position candidates and calculate one estimated pattern. Note that the estimated patterns and the hypothetical patterns may be written in any way.

The radio apparatuses 2 are capable of directly performing radio communication with other radio apparatuses 2 through radio waves transmitted and received. It is assumed that the radio apparatuses 2 can change output power values of the radio waves according to an instruction from the radio-apparatus-disposition estimation device 1. However, the radio apparatuses 2 may be unable to change the output power value. It is assumed that the radio apparatuses 2 receives the instruction from the radio-apparatus-disposition estimation device 1 and changes the output power values of the radio waves. However, the radio apparatuses 2 themselves may determine and change the output power value.

The sections of the radio-apparatus-disposition estimation device 1 are explained below.

The acquirer 11 collects measurement information from the radio apparatuses 2 via the communication network. The measurement information is information necessary for the radio-apparatus-disposition estimation device 1 to estimate disposition of the radio apparatuses 2. Information concerning communication, a radio wave, and the like among a respective plurality of the radio apparatuses 2 is conceivable as the measurement information. Details of the measurement information are explained below in explanation of the estimator 13.

The acquirer 11 may perform polling and acquire the measurement information at any timing. Alternatively, the radio apparatuses 2 may transmit the measurement information to the acquirer 11 at any timing. Information such as an IP address for communicating with the radio apparatuses 2 may be acquired from the user or another system via the input section 12 in advance.

The input section 12 acquires candidates of setting positions of the radio apparatuses 2 via the user, the other system, or the like. The setting position candidates are assumed to be represented by information concerning two-dimensional or three-dimensional coordinates. As a representation method of positions on coordinates, there are various methods such as positions on an x axis, a y axis, and a z axis, distances from a reference point, angles, and a combination thereof. The representation method is not particularly limited.

The input section 12 acquires radio wave propagation models among the respective setting position candidates of the radio apparatuses 2 via the user, the other system, or the like. The radio propagation models are model formulas concerning propagation of radio waves of the radio apparatuses 2. As the radio propagation models, various model formulas are assumed according to, for example, an environment in which the radio apparatuses 2 are set. The radio wave propagation models are not particularly limited. The influence of the environment in which the radio apparatuses 2 are set such as reflection of the radio waves on a wall surface may be reflected on the radio wave propagation models.

The estimator 13 estimates combinations of the radio apparatuses 2 and the setting position candidates, and calculates estimated patterns. Processing of the estimator 13 is referred to as disposition estimation. As a method of performing the disposition estimation, various methods are conceivable. Distances among the setting position candidates, measurement information, radio wave propagation models, and the like are used.

The distances among the setting position candidates may be calculated by the estimator 13 on the basis of the setting position candidates acquired from the input section 12. Calculation methods for the distances only have to be decided in advance. The estimator 13 may select a calculation method according to input information concerning the setting position candidates. Note that, when the distances among the setting position candidates have been acquired in advance via the input section 12 or the like, the distances do not have to be calculated.

As the measurement information, information concerning communication and information concerning a radio wave are conceivable. The information concerning communication is such as a result of a communication connection which indicates whether the radio communication connection is successfully performed or not, a packet loss ratio, and a delay. A result of a communication connection indicates whether a radio communication connection is performed or not is referred to as a communication connection results. The information concerning a radio wave is such as a power value and strength of an output radio wave, a received signal strength indicator (RSSI), a signal to noise ratio (SNR), a frequency, polarization, and fading. Note that the above is an example. The measurement information is not particularly limited and only has to be usable information. A plurality of kinds of measurement information may be used.

The estimator 13 estimates a distance between the radio apparatuses 2 on the basis of the measurement information. In general, a radio wave is attenuated more as a transmission distance is larger. In a case where the radio wave is attenuated to strength smaller than radio wave strength needed when the radio apparatus 2 on a reception side performs decoding, communication is not established. Therefore, when radio communication is established between two radio apparatuses 2, it can be estimated that the radio apparatuses 2 are disposed at a relatively short distance. When the radio communication is not established, it can be estimated that the radio apparatuses 2 are disposed at a long distance. It is possible to more accurately estimate the distance between the radio apparatuses 2 by using information such as transmission radio wave strength, RSSI, and SNR.

Information concerning an antenna used for transmission and reception of a radio wave such as a direction, an angle, a radio wave shield, and a gain of an amplifier circuit of the antenna may be included in the measurement information. For example, by using a plurality of antennas during transmission of a radio wave, it is possible to limit a distance, an angle, and a position of radio wave arrival and narrow down estimated patterns. The directivity of the antenna can be adjusted according to the direction, the radio wave shield, and the like of the antenna. When the radio wave apparatus 2 includes a plurality of antennas, it is sometimes possible to estimate a distance, an angle, and a position to a transmission antenna. In that case, it is possible to perform more accurate estimation by including position information in the measurement information.

(Estimation Method 1)

Figures 3A, 3B:
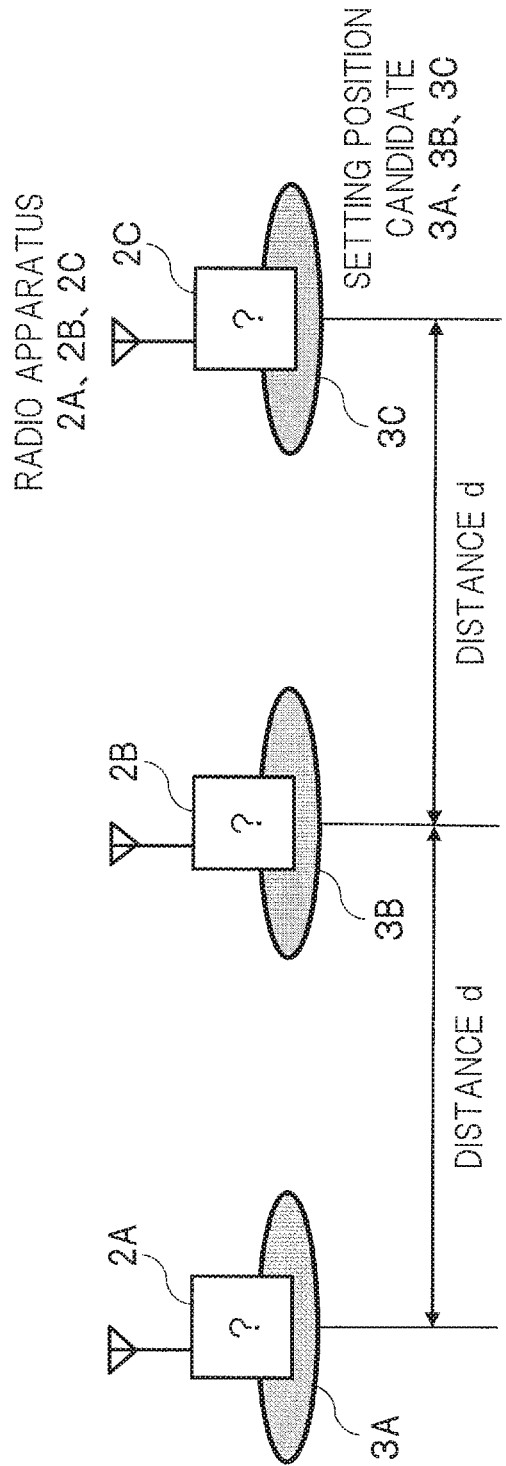
FIGS. 3A and 3B are diagrams showing an example of disposition estimation.

FIGS. 3A and 3B are diagrams showing an example of disposition estimation. In the disposition estimation, distances among setting position candidates and a communication connection result as measurement information are used. In FIG. 3A, it is assumed that three radio apparatuses 2A, 2B, and 2C and three setting position candidates 3A, 3B, and 3C are present in a free space without an obstacle. It is assumed that the distance between 3A and 3B is "d" (d is a positive real number), the distance between 3B and 3C is "d", and the distance between 3A and 3C is "2d". It is assumed that the radio apparatuses 2 are set in any ones of the setting position candidates without overlapping one another. It is assumed that, as actual disposition of the radio apparatuses 2, the radio apparatuses 2A is set in the setting position candidate 3A, the radio apparatuses 2B is set in the setting position candidate 3B, and the radio apparatuses 2C is set in the setting position candidate 3C. This disposition is represented as (3A, 3B, 3C)=(2A, 2B, 2C). It is assumed that the radio-apparatus-disposition estimation device 1 does not recognize correct combinations of the radio apparatuses 2 and the setting position candidates.

It is assumed that the radio apparatus 2A is transmitting a radio wave at an output power value $W_{d\text{-}2d}$ and the estimator 13 is acquiring communication connection results of the radio apparatuses 2B and 2C to the radio wave as measurement information. It is assumed that the output power $W_{d-2d}$ is output power sufficient to perform radio communication with a radio apparatus 2 apart by the distance "d" and is output power insufficient to perform radio communication with a radio apparatus 2 apart by the distance "2d".

Note that the radio apparatus 2A, 2B, or 2C may record the communication connection result. The radio apparatus 2A can discriminate whether the radio communication connection is performed or not according to whether a response is returned after the radio wave is transmitted. If time when the radio apparatus 2A transmits the radio wave is notified to the radio apparatuses 2B and 2C in advance, the radio apparatuses 2B and 2C can discriminate whether the radio communication connection is performed or not. When the radio apparatus 2 on the reception side records the communication connection result, it is possible to prevent a situation in which the radio apparatus 2 on a transmission side receives a plurality of communication connection results at a time from a plurality of radio apparatuses 2 on the reception side.

The estimator 13 calculates hypothetical patterns. In the example shown in FIG. 3A, the hypothetical patterns are six patterns in total as shown in FIG. 3B. The hypothetical patterns may be calculated using a publicly-known search algorithm. Note that the hypothetical patterns may be acquired from another system or the like via the input section 12.

Subsequently, the estimator 13 limits the hypothetical patterns referring to the communication connection results of the radio apparatus 2A and other radio apparatuses 2 from the measurement information. Since the radio apparatus 2A is emitting an output radio wave at the output power $W_{d-2d}$, communication connection from the radio apparatus 2A to the radio apparatus 2B is possible and communication connection from the radio apparatus 2A to the radio apparatus 2C is impossible. Therefore, the estimator 13 estimates that the distance between the radio apparatus 2A and the radio apparatus 2B is shorter than the distance between the radio apparatus 2A and the radio apparatus 2C.

The estimator 13 calculates distances among the three setting position candidates 3A, 3B, and 3C on the basis of input setting position candidates and recognizes that both the distance between 3A and 3B and the distance between the 3B and 3C are "d". Consequently, it is possible to estimate that the radio apparatus 2A is absent and the radio apparatus 2B is present in the setting position candidate 3B. Therefore, the six hypothetical patterns can be narrowed down to two hypothetical patterns 1 and 6. Note that, when the hypothetical patterns cannot be further narrowed down according to the measurement information, the estimator 13 may set all of the narrowed-down patterns as estimated patterns.

Note that, for example, when information necessary for estimating positions is insufficient, the estimator 13 may request necessary information. For example, in the example shown in FIGS. 3A and 3B, when the radio apparatus 2A continues to transmit a radio wave at output power insufficient for performing radio communication with the radio apparatus 2 apart by the distance "d", the estimator 13 cannot estimate disposition indefinitely. Therefore, the estimator 13 may request the radio apparatus 2A to output the radio wave at the output power $W_{d-2d}$.

The distance between the setting position candidates 3A and 3B and the distance between the setting position candidates 3B and 3C are the same. Therefore, after the disposition patterns are narrowed down to the two disposition patterns on the basis of the communication connection results obtained in a case where the output power is $W_{d-2d}$, even if information concerning distances is further acquired, the estimator 13 cannot narrow down to one disposition pattern from the two disposition patterns. The estimator 13 may request the radio apparatus 2A to transmit information concerning a direction necessary for estimation, for example, information concerning an antenna having different gains in the left and right directions and having directivity.

However, the direction of the antenna is also relative information. Therefore, the setting position candidates are symmetrically arranged as shown in FIG. 2A and FIG. 3A, the hypothetical patterns cannot be narrowed down to one hypothetical pattern. For example, in FIG. 3A, even if it is identified that the antenna of the radio apparatus 2A is directed to the right with respect to the front, if the direction of the front of the radio apparatus 2A is unknown, it is impossible to specify whether the radio apparatus 2A is set in the setting position candidate 3A or set in the setting position candidate 3C. In this way, when the setting position candidates are symmetrical, the patterns cannot be finally narrowed down to one pattern. Therefore, a plurality of patterns are output as an estimation result.

Note that, in the above explanation, none of the positions of the radio apparatuses 2 is identified. However, when information concerning an anchor node, a position of which is identified and which is one of the radio apparatuses 2, or position information of apparatuses other than the radio apparatuses 2 can be used, the estimation may be performed using these kinds of information.

(Estimation Method 2)

In the example explained above, it is assumed that the radio apparatus 2 outputs the radio wave at the output power value $W_{d-2d}$. However, in this example, it is assumed that the radio apparatus 2 changes an output power value and acquires an output power value at which the radio apparatus 2 can perform communication connection to the other radio apparatuses 2.

In this example, in a situation same as the situation of the example shown in FIGS. 3A and 3B, it is assumed that the radio apparatus 2 periodically outputs, on the basis of a group of n (n is a positive real number) pieces of output power Ws (Ws={W0, W1, . . . , Wn}), the output power included in Ws. The radio apparatus 2 may acquire information concerning the output power group Ws from the radio-apparatus-disposition estimation device 1. The radio-apparatus-disposition estimation device 1 may decide, at random, output power values included in Ws or may decide the output power values according to a fixed difference or ratio like a geometric/arithmetic progression. The user may input these values via the input section 12.

Rather than giving the output power values Ws to the radio apparatus 2, the radio-apparatus-disposition estimation device 1 may instruct the radio apparatus 2 to increase or decrease the output power values until the radio apparatus 2 becomes capable of performing communication connection to the other radio apparatuses 2 or becomes incapable of performing the communication connection to the other radio apparatuses 2.

The radio apparatus 2 transmits, for each of the other radio apparatuses 2, a minimum output power value among output power values at the time when radio communication connection is performed and IDs of the partner radio apparatuses 2 to the radio-apparatus-disposition estimation device 1 as measurement information. Note that the radio apparatus 2 on the reception side may transmit the minimum output power value and the IDs to the radio-apparatusdisposition estimation device 1. Alternatively, the acquirer 11 or the estimator 13 of the radio-apparatus-disposition estimation device 1 may extract, from all pieces of received power included in the measurement information, on the basis of a communication connection result, minimum received power at which the communication connection is performed between the radio apparatuses 2.

FIGS. 4A and 4B are diagrams showing another example of the disposition estimation. FIG. 4A is a table of minimum output values of a radio wave between the radio apparatuses 2. For example, $W_{ab}$ indicates a minimum output power value at the time when the transmission side is 2A and the reception side is 2B. FIG. 4B is a table indicating conditions (discrimination conditions) that the minimum output power values shown in FIG. 4A should satisfy in hypothetical patterns. In a pattern 1, the distance between the setting position candidates 3A and 3B and the distance between the setting position candidates 3B and 3C are the same distance "d". Therefore, $W_{ab}$ and $W_{bc}$ are substantially the same values. On the other hand, the distance between the setting position candidates 3A and 3B is a half of the distance between the setting position candidates 3A and 3C. Therefore, $W_{ab}$ is considered to be smaller than $W_{ac}$.

Therefore, for the pattern 1, the minimum output power values need to satisfy these two conditional expressions.

When the distance between the radio apparatuses 2 is calculated, the estimator 13 calculates the hypothetical patterns and the conditional expressions to narrow down the hypothetical patterns and calculate estimated patterns from the acquired minimum output power values.

(Estimation Method 3)

In the example explained above, the hypothetical patterns are limited by comparing the distances or the minimum output power values, at which the communication connection is performed, among the radio apparatuses 2. Other than the method, it is also possible to calculate the distances, at which the communication connection is possible, using a radio wave propagation model to limit the hypothetical pattern. A method of estimating the distances using the radio wave propagation model is explained below.

The estimator 13 calculates possibility of communication connection at a point apart by the distance "d" and a point apart by the distance "2d" on the basis of the output power value $W_{d-2d}$, which is the measurement information, and a given radio wave propagation model. Various models may be used as the radio wave propagation model. The radio wave propagation model to be used may be changed among the radio apparatuses 2. As an example, a method of estimating the distances using a radio wave propagation model in a free space is explained. The radio wave propagation model in the free space is represented by the following expression:

$$W_r(x) = \frac{G_s G_r}{\Gamma(x)} W \quad \text{[Expression 1]}$$

In the expression 1, x represents the distance from the radio apparatus 2 on the transmission side. $W_r(x)$ represents received power received by the radio apparatus 2 on the reception side present at the distance "x" from the radio apparatus 2 on the transmission side. W represents output power of the radio apparatus 2 on the transmission side, $G_s$ represents an antenna gain of the radio apparatus 2 on the transmission side, $G_r$ represents an antenna gain of the radio apparatus 2 on the reception side, and $\Gamma(x)$ represents a free space propagation loss (a pass loss) at the distance "x". The free space propagation loss $\Gamma(x)$ is represented by the following expression when a wavelength of a radio wave is represented as $\lambda$:

$$\Gamma(x) = \left(\frac{4\pi x}{\lambda}\right)^2 \quad \text{[Expression 2]}$$

Therefore, $W_r(x)$ is represented as indicated by the following expression:

$$W_r(x) = \left(\frac{\lambda}{4\pi x}\right)^2 G_s G_r W \quad \text{[Expression 3]}$$

In the radio apparatus 2 on the reception side, when necessary minimum received power for enabling communication connection is represented as $W_{rmin}$, if the received power $W_r(x)$ is smaller than $W_{rmin}$, the communication connection is impossible. As explained above, the output power $W_{d-2d}$ is defined as the output power sufficient for performing radio communication with a radio apparatus 2 apart by the distance "d" and the output power insufficient for performing radio communication with a radio apparatus 2 apart by the distance "2d". Therefore, the following expressions are satisfied:

$$W_r(d) = \left(\frac{\lambda}{4\pi d}\right)^2 G_s G_r W_{d-2d} > W_{rmin} > W_r(2d) = \quad \text{[Expression 4]}$$
$$\left(\frac{\lambda}{4\pi(2d)}\right)^2 G_s G_r W_{d-2d}$$

$$\left(\frac{4\pi d}{\lambda}\right)^2 \frac{W_{rmin}}{G_s G_r} < W_{d-2d} < 4\left(\frac{4\pi d}{\lambda}\right)^2 \frac{W_{rmin}}{G_s G_r} \quad \text{[Expression 5]}$$

The estimator 13 realizes using the above expressions that, with the output power value $W_{d-2d}$, the communication connection is possible at the distance "d" but the communication connection is impossible at the distance "2d". From a communication connection result indicating that the communication connection between the radio apparatus 2A and the radio apparatus 2B is performed, the estimator 13 determines that the distance between the radio apparatus 2A and the radio apparatus 2B is "d". From a communication connection result indicating that the communication connection between the radio apparatus 2A and the radio apparatus 2C is not performed, the estimator 13 determines that the distance between the radio apparatus 2A and the radio apparatus 2C is "2d". Consequently, even when the radio wave propagation model is used, it is possible to narrow down the six hypothetical patterns to the two hypothetical patterns 1 and 6.

$G_s$, $G_r$, $W_{rmin}$, and $\lambda$ necessary for calculation of values may be acquired from the user or the other system via the input section 12. The gains $G_s$ and $G_r$ may be acquired from the radio apparatus 2 via the acquirer 11. Note that, when the gains $G_s$ and $G_r$ are unknown and cannot be acquired from the radio apparatus 2 or when, for example, the influence of environment is taken into account, the gains $G_s$ and $G_r$ may be calculated by measuring radio apparatuses of the same model as radio apparatuses 2 in a radio wave dark room or the like. Values of the gains change according to an angle of the antenna. Therefore, it is also possible to, after calculating a hypothetical pattern, calculate an angle from a positional relation among the radio apparatuses 2 in the hypothetical pattern, calculate the gains $G_s$ and $G_r$, and cause the estimator to estimate distances again to improve reliability of an estimation result.

The distance "x" between the radio apparatus 2 on the transmission side and the radio apparatus 2 on the reception side may be calculated by receiving received power of the radio apparatus 2 on the reception side as measurement information and substituting the received power in the received power $W_r(X)$ rather than determining the possibility of the communication connection.

(Estimation Method 4)

In the example explained above, the radio wave propagation model in the free space is used. However, in an actual environment, the communication connection is affected by multipath fading, shadowing, and the like. Therefore, it could occur that the communication connection is not performed even at a distance at which the communication connection is possible and the communication connection is performed even at a distance at which the communication connection is impossible. Therefore, a method of estimating distances according to the received signal strength indicator RSSI rather than the communication connection results is explained.

The received signal strength indicator RSSI is represented by the following expression using the radio wave propagation model in the free space and a random value "X":

$$W_r(x) = \frac{G_s G_r}{\Gamma(x)} W + X \qquad \text{[Expression 6]}$$

Actually, it is extremely difficult to determine the random value "X" and calculate actual received signal strength indicator. Therefore, the random value "X" is approximated on the basis of a measured value under an environment equivalent to an environment in which the radio apparatus 2 is set.

FIGS. 5A and 5B are diagrams showing an example of a method of calculating the random value "X". FIG. 5A is a diagram showing a measured value of the RSSI. It is assumed that the measured value is obtained beforehand by an experiment or the like under an environment equivalent to the environment in which the radio apparatus 2 is set. The random value "X" is calculated by subtracting an approximated value of a first term on the right side of Expression 6 Including $\Gamma(x)$, which depends on a distance, from the measured value $W_r(x)$ of the RSSI. FIG. 5B is a histogram of the random value "X". According to the histogram, it is possible to grasp a number of random values "X" belonging to a certain fixed range of the histogram of the random value "X". The number of random values "X" belonging to the certain fixed range may be divided by the total number of random values "X" in the entire histogram to calculate a probability density distribution. The random value "X" of the radio wave propagation model to be used may be decided on the basis of the probability density distribution.

After the estimator 13 determines the random value "X" of the radio wave propagation model, same as the estimation method explained above, the possibility of the communication connection at the distance "d" or "2d" may be determined and compared with a communication connection result. The distance "x" between the radio apparatus 2 on the transmission side and the radio apparatus 2 on the reception side may be calculated on the basis of reception power of the radio apparatus 2 on the reception side.

(Estimation Method 5)

As explained in the above example, in the actual radio communication, a radio wave is propagated differently from a radio wave propagation characteristic in the free space because of a multipath and the presence of an obstacle. The random value "X" is estimated according to the probability density distribution but is not always an appropriate value. Therefore, even in a correct hypothetical pattern, measurement information such as a communication connection result or a received power value sometimes does not satisfy a given radio wave propagation model. If the estimator 13 eliminates the correct hypothetical pattern, the correct hypothetical pattern cannot be obtained. Therefore, the estimator 13 calculates, on the basis of an occurrence probability Pr of a certain event, a likelihood of occurrence of the event and a likelihood of all hypothetical patterns and set a most likely hypothetical pattern as an estimated pattern.

Figure 6:
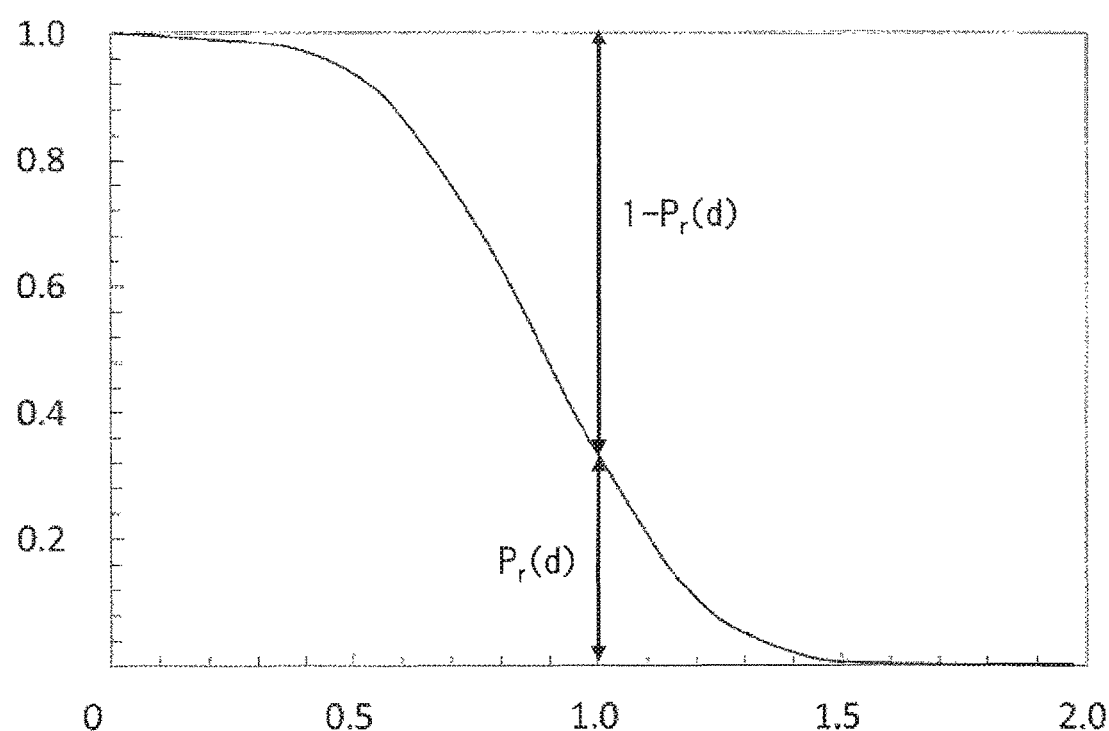
FIG. 6 is a diagram showing an example of an occurrence probability Pr.

FIG. 6 is a diagram showing an example of the occurrence probability Pr. It is assumed that the occurrence probability Pr in FIG. 6 indicates a probability of communication connection possibility at the distance "d" at the time when certain predetermined output power W is output. The abscissa of FIG. 6 represents the distance "d" from the radio apparatus 2 on the transmission side. The ordinate represents a value of the occurrence probability Pr. A curve represents a probability function Pr(d) indicates the occurrence probability Pr of communication connection to the radio apparatus 2 on the reception side at the distance "d". The estimator 13 calculates a likelihood of an event on the basis of the probability function Pr(d). For example, according to FIG. 6, when the distance "d" is 1.0, Pr(d) is approximately 0.35. This means that the communication connection is possible at a probability of approximately 0.35 with the radio apparatus 2 apart by a distance of approximately 1.0. Therefore, the communication connection is performed with the radio apparatus 2 apart by the distance of 1.0, the estimator 13 sets a likelihood of this event as Pr(1.0)=0.35. When the communication connection is not performed, the estimator 13 sets the likelihood of this event as 1-Pr(1.0) =0.65. In this way, when a value of a probability function Pr(d) is low, an event in which the communication connection is not performed is considered to be likely and an event in which the communication connection can be performed is considered to be unlikely (rare).

Note that the occurrence probability Pr is not limited to the probability of the communication connection possibility and may be a probability of satisfaction of a radio wave propagation model. For example, when a radio wave propagation model of the received signal strength indicator RSSI is given, the probability function Pr(d) may be a probability that an actual received signal strength indicator RSSI at the distance "d" is equal to or lower than the received signal strength indicator RSSI calculated by a radio wave propagation model expression.

The probability function Pr(d) may be acquired from the user or the other system via the input section 12. The probability function Pr(d) may be calculated by approximating a probability function Pr(d) obtained by an experiment under the same environment or may be calculated on the basis of measurement information acquired from the radio apparatus 2 in advance. A simple power function or the like may be used as the probability function Pr(d).

Assumed hypothetical patterns are represented as $H_i(H_i=\{H1, H2, \ldots, H\})$. The estimator 13 calculates a likelihood $P_H(H_i)$ concerning communication connection possibility in the hypothetical patterns $H_i$ on the basis of the probability function Pr(d). $P_H(H_i)$ is represented by the following expression:

$$P_H(H) = \Pi p_A(x,y,i) \quad \text{[Expression 7]}$$

$P_A(x, y, i)$ represents a likelihood of an event that occurs between a radio apparatus x and a radio apparatus y in the hypothetical patterns $H_i$. As explained above, the likelihood of the event is represented by the probability function Pr(d) and 1-Pr(d) of the event. That is, in the hypothetical patterns $H_i$, when an event occurs between the radio apparatus x and the radio apparatus y, for example, when the communication connection is performed, $P_A(x, y, i)$ means Pr(d). When an event does not occur between the radio apparatus x and the radio apparatus y, for example, the communication connection is not performed, $P_A(x, y, i)$ means 1-Pr(d). The estimator 13 integrates likelihoods of events among all the radio apparatuses 2 and calculates a likelihood of the hypothetical patterns.

The estimator 13 may perform the calculation of $P_H(H_i)$ on all the hypothetical patterns or may perform the calculation of $P_H(H_i)$ on a part of the hypothetical patterns. For example, when hypothetical patterns are narrowed down by another estimation method in advance or when the number of hypothetical patterns is larger than a predetermined number, it is conceivable to perform the calculation of $P_H(H_i)$ on a part of the hypothetical patterns. When a radio wave is output a plurality of times, the estimator 13 may regard the outputs as independent trials and calculate a probability for each of the outputs. The estimator 13 determines a hypothetical pattern having largest $P_H(H_i)$ among calculated $P_H(H_i)$ as a most likely hypothetical pattern.

In this estimation method, when the number of radio apparatuses 2 is small as in the example shown in FIGS. 3A and 3B, no problem occurs even if the calculation of $P_H(H_i)$ is performed targeting all the hypothetical patterns. However, according to an increase in the number of radio apparatuses 2, the number of hypothetical patterns and the number of combinations of the radio apparatuses 2 explosively increase. Usually, when the number of radio apparatuses 2 is represented as "n", the number of disposed patterns is a power of n. Note that, when setting position candidates have symmetry, the number of disposed patterns decreases. The number of combinations of any two radio apparatuses 2 is $_nC_2$. For example, when the number of radio apparatuses 2 is twenty, the number of patterns is approximately $2.4 \times 10^{18}$ and the number of combinations is one hundred ninety. Therefore, it is unrealistic to calculate $P_H$ of all the hypothetical patterns and $P_A(x, y, i)$ among all the radio apparatuses 2. Therefore, the estimator 13 may perform estimation targeting a part of the hypothetical patterns and a part of the radio apparatuses 2 using a simple randomized method.

The randomized method is a method of selecting at random, when there are a plurality of target candidates of calculation, a target candidate from the plurality of target candidates without selecting the target candidate in order given in advance such as the order of IDs.

For example, when the target candidate is selected in the order given in advance, if hypothetical patterns with low likelihoods gather in the beginning, time up to identification of a hypothetical pattern with a high likelihood is long. On the other hand, when the hypothetical patterns are calculated by the randomized method, the time up to identification of a hypothetical pattern with a high likelihood is not affected by deviation of the hypothetical patterns. Therefore, by performing the calculation to a predetermined number of times using the randomized method, it is possible to obtain a reasonably correct estimation result even if the calculation is not performed on all the target candidates. Besides the randomized method, a publicly-known algorithm such as a GA method may be used.

The estimator 13 prepares S (S is an integer equal to or larger than 2) hypothetical patterns. The S hypothetical patterns may be optionally decided. The radio apparatuses 2 may be disposed in setting position candidates at random or the user may designate the radio apparatuses 2. Initial values of evaluation values for the setting position candidates, where the radio apparatuses 2 are disposed, are set in the radio apparatuses 2. The initial values of the evaluation values may be optionally decided.

The estimator 13 replaces two radio apparatuses 2 selected at random from one hypothetical pattern. If a difference $\Delta P_H$ of a likelihood of the hypothetical pattern after the replacement increases, the estimator 13 reduces evaluation values of the setting position candidates before the replacement and increases evaluation values of the setting position candidates after the replacement. The estimator 13 adds a pattern generated by the replacement to the hypothetical pattern. The replacement may be repeated a plurality of times. The estimator 13 carries out the replacement on all the hypothetical patterns. The estimator 13 sorts the hypothetical patterns in descending order of likelihoods and omits the hypothetical patterns lower in order of likelihoods than higher order N sets of hypothetical patterns (N is an integer equal to or larger than 1 and smaller than S). The estimator 13 performs the same processing on the higher order N sets. This processing is repeated and one $P_H$ having the highest likelihood is selected. The number of repetitions may be optional. A condition for ending the repetition, such as a condition that the repetition is ended when an evaluation value exceeds a predetermined reference value, may be decided.

In the repetition, the estimator 13 may send an instruction to the radio apparatuses 2 via the decider 15 or the like in order to narrow down the hypothetical patterns. For example, the estimator 13 may narrow down setting positions of a specific radio apparatus 2 by causing the specific radio apparatus 2 to change the output power W.

An example of a method in which the estimator 13 narrows down the setting positions is explained below. A set of hypothetical patterns, in which setting position candidates of the specific radio apparatus 2 are common, is represented as an estimated set PS. A set of the radio apparatuses 2, setting position candidates of which are common, is represented as a common radio apparatus set C. For example, when hypothetical patterns, in which setting position candidates of the radio apparatus 2A are common, are collected, if setting position candidates of the radio apparatus 2B are also common in all the hypothetical patterns, the estimator 13 includes the radio apparatus 2B in the common radio apparatus set C as well. Subsequently, the estimator 13 selects a certain radio apparatus r not included in the common radio apparatus set C. The estimator 13 checks a setting position of the radio apparatus r in the hypothetical patterns included in the estimated set PS and includes the setting position of the radio apparatus r in a set L of setting position candidates of the radio apparatus r. Since the radio apparatus r is not included in the common radio apparatus set C, two or more setting position candidates are always included in the set L. The estimator 13 instructs a certain radio apparatus c included in the common radio apparatus set C to output a radio wave at an output power value $W_c$ that reaches a part of the setting position candidates included in the set L and does not reach another part of the setting position candidates. If the radio apparatus c outputs the radio wave at the output power value $W_c$ following the instruction from the estimator 13, it is possible to narrow down the setting position candidates included in the set L according to a communication connection result of the radio apparatus c and the radio apparatus r.

The output power value $W_c$ may be calculated by the decider 15 using a radio wave propagation model. The estimator 13 may instruct the radio apparatus c to adjust the output radio wave rather than instructing the output power value. The radio apparatus c instructed to adjust the output radio wave reduces the output power where its communication connection to the radio apparatus r is performed at the present output power. The radio apparatus c instructed to adjust the output radio wave increases the output power where its communication connection to the radio apparatus r is not performed at the present output power. Consequently, an output power value at which the communication connection result changes is identified. By transmitting the output power value as measurement information, the estimator 13 can estimate a distance between the radio apparatus c and the radio apparatus r.

Note that, in the above explanation, the estimator 13 performs a plurality of estimation methods. However, for the respective estimation methods, the estimator 13 may be divided into sections for executing the estimation methods. For respective kinds of processing of the estimation methods, the estimator 13 may be divided into sections for performing the processing. The estimator 13 may be divided into, for example, a section that calculates distances among the radio apparatuses 2, a section that calculates likelihoods of events among the radio apparatuses 2, a section that calculates likelihoods of respective hypothetical patterns, and a section that determines a most likely hypothetical pattern.

The determiner 14 performs determination for a calculated hypothetical pattern. The hypothetical pattern is determined on the basis of conditions, for example, that a likelihood of the hypothetical pattern is equal to or higher than a predetermined threshold and the number of hypothetical patterns is equal to or larger than a threshold. When it is determined that the conditions are satisfied, the determiner 14 sends the hypothetical pattern to the output section 17. When it is determined that the conditions are unsatisfied, the determiner 14 may cause the estimator 13 to perform the disposition estimation again or may inform the output section 17 that the conditions are unsatisfied.

The decider 15 decides content instructed to the radio apparatus 2. As the instruction, as explained above, adjustment of an output power value and an output radio wave that the radio apparatus 2 should output, a transmission request of measurement information necessary for the disposition estimation of the estimator 13, and the like are conceivable.

When the decider 15 receives the determination result of the determiner 14 and the estimator 13 needs to perform the disposition estimation again, the decider 15 may decide the instruction content. Alternatively, the decider 15 may decide the instruction content before the estimator 13 performs first disposition estimation. For example, the estimator 13, which acquires setting position candidates from the Input section 12, calculates distances among the radio apparatuses 2. The decider 15 calculates an output power value necessary for estimation on the basis of the distances among the radio apparatuses 2 and a radio wave propagation model and instructs the radio apparatus 2 about the output power value. Consequently, the radio apparatus 2 outputs a radio wave at suitable output power for the disposition estimation from the beginning. Therefore, a situation in which the disposition estimation is performed again does not occur. It is possible to efficiently estimate setting positions.

Note that the decider 15 may transmit necessary information to the radio apparatus 2 via the transmitter 16. The radio apparatus 2 may calculate the output power W.

The transmitter 16 transmits an Instruction decided by the decider 15 to the radio apparatus 2 that should receive the instruction. Information for communicating with the radio apparatus 2 such as an IP address may be acquired by the transmitter 16, same as the acquirer 11 performs, via the input section 12 in advance.

The output section 17 outputs a combination estimated by the estimator 13. An output method may be displaying it on a screen or may be saving it in a file or the like.

Figure 7:
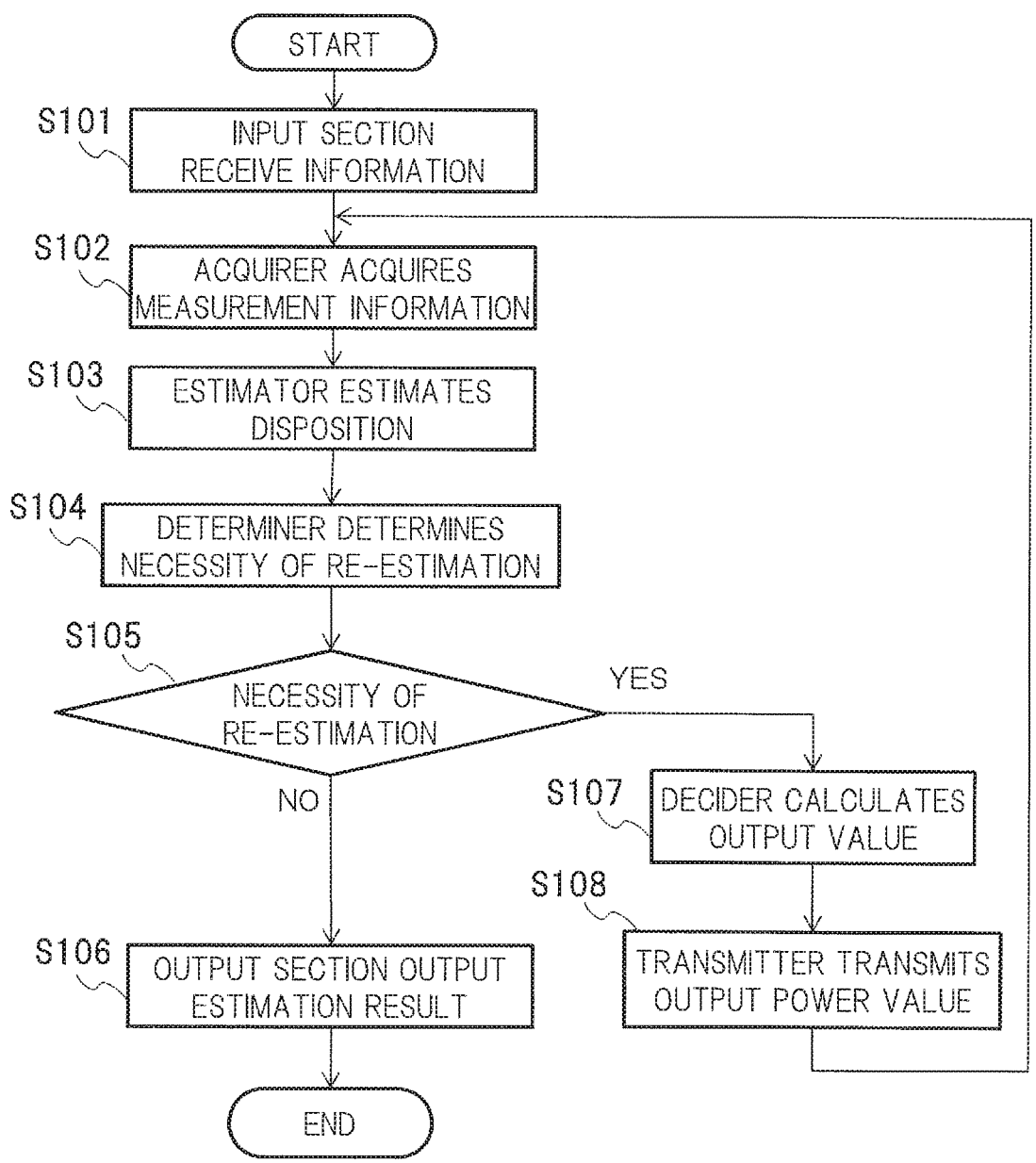
FIG. 7 is a flowchart of overall processing of the radio-apparatus-disposition estimation device.

Processing performed by the radio-apparatus-disposition estimation device 1 according to this embodiment is explained. FIG. 7 is a flowchart of overall processing of the radio-apparatus-disposition estimation device 1. The flowchart is an example and is not particularly limited. For example, the order of processing of the acquirer 11 and the input section 12 may be reversed. The flowchart is started from an input to the input section 12. However, the flowchart may be irregularly or regularly started, for example, started at predetermined time.

The input section 12 receives information concerning the radio apparatus 2, setting position candidates, parameters used for estimation, and the like from the user, the other system, or the like (S101). The received parameters are sent to the estimator 13.

The acquirer 11 acquires measurement information of the radio apparatuses 2 (S102). The acquired measurement information is sent to the estimator 13. It is assumed that the acquirer 11 receives an Instruction of the input section 12 and acquires the measurement information. However, where the information concerning the radio apparatus 2, for example, IP addresses and the like are acquired beforehand, the acquirer 11 may acquire the measurement information at any timing. Before acquiring the measurement information, the acquirer 11 may give the radio apparatus 2 a start instruction of the measurement, an output power value used for measurement, and the like.

Note that the radio apparatus 2 instructed to start the measurement may be controlled to transmit one or a plurality of broadcast packets on the basis of the instruction or predetermined conditions. The order of transmission and the number of broadcast packets to be transmitted may be random or may be a predetermined value. The radio apparatus 2 may receive broadcasts transmitted from other radio apparatuses 2 and record the number of received packets, a list of RSSIs, or statistical values such as an arithmetic mean, a mode, a median, a maximum, and a minimum as measurement information.

The estimator 13 acquires the information sent from the Input section 12 and the measurement information sent from the acquirer 11 and performs disposition estimation (S103). An estimation method performed by the estimator 13 may be decided in advance. The user or the other system may instruct the estimation method via the input section 12. The disposition estimation may be performed by a plurality of methods. An estimation result is sent to the determiner 14. However, the estimation result may be sent to the output section 17 and output without undergoing determination by the determiner 14.

The determiner 14 determines necessity of re-estimation (S104). Criteria of the determination may be decided in advance. For example, the determiner 14 may determine that the re-estimation is performed when estimated patterns are not narrowed down to one pattern. The criteria of the determination may be changed for each kind of processing. For example, it is conceivable that the condition is eased to a condition that the estimated patterns may be three or less where the number of times of the re-estimation is counted and the number of times of the re-estimation exceeds a threshold. When it is determined that the re-estimation is unnecessary (NO in S105), the output section 17 outputs an estimated pattern as an estimation result (S106).

When it is determined that the re-estimation is necessary (YES in S105), the decider 15 decides content to be instructed to the radio apparatus 2 (S107). As the content to be instructed, for example, changes of an output power value of a transmitted radio wave and a radio channel are conceivable. Since minimum necessary measurement information to perform the re-estimation can be acquired, a target of the instruction may be a part of the radio apparatuses 2 rather than all of the radio apparatuses 2. However, when the radio channel is changed, the channel change needs to be transmitted to all of the radio apparatuses 2.

The transmitter 16 transmits, for example, an output power value of a transmission radio wave to the target radio apparatus 2 (S108). The Information concerning the radio apparatus 2 such as an IP address may be acquired from the acquirer 11 or may be acquired from the decider 15.

After the transmitter 16 transmits the instruction, the acquirer 11 acquires measurement information again (S102) and the processing is repeated. The flowchart of the overall processing of the radio-apparatus-disposition estimation device 1 is as explained above.

As explained above, according to the embodiment of the present invention, even when a setting position of none of the radio apparatuses is identified, it is possible to estimate disposition of the radio apparatuses from the candidates of setting positions.

Even when the information concerning setting positions has been acquired, the embodiment of the present invention can also be used for check whether the setting positions of the Information are actually correct.

For example, when a large quantity of solar panels (solar power generators, solar batteries, and Photovoltaic (PV)) are set to construct a mega-solar system that performs power generation, a power converter (an inverter or a power conditioning system (PCS)) including a radio function is sometimes attached to the panels. With the radio function, the system notifies an ID of an apparatus in which a failure occurs. However, since a large number of panels of the same type are treated during the system construction, the solar panels tend to be mistaken. Since power conversion is possible even if setting positions of solar panels are mistaken, the mistake is hardly noticed. Therefore, it is likely that disposition data is incorrect. Therefore, after the mega-solar system is constructed, according to one embodiment of the present invention, it is confirmed that combinations of IDs of the solar panels and the setting positions are correct. Consequently, it is possible to prevent a situation in which the mistake is noticed for the first time when a failure occurs and recovery is delayed.

Note that, besides the inverter of the solar power generation, a disposition of other radio apparatuses can be estimated. Examples of other radio apparatuses are radio apparatuses that control illuminations set in a building or a large facility and individual wireless-enabled apparatus such as indoor units, remote controllers, and the like of air conditioners. Note that, as in the example explained above, when types of the disposed radio apparatuses are not the same, the types of the radio apparatuses can be determined. Therefore, if correspondence between IDs and types of radio apparatuses is identified, it is possible to narrow down hypothetical patterns using information concerning the correspondence.

The respective kinds of processing in the embodiment explained above can be realized by software (a program). Therefore, the estimation device in the embodiment explained above can be realized by, for example, using a general-purpose computer device as basic hardware and causing a processor mounted on the computer device to execute the program.

Figure 8:
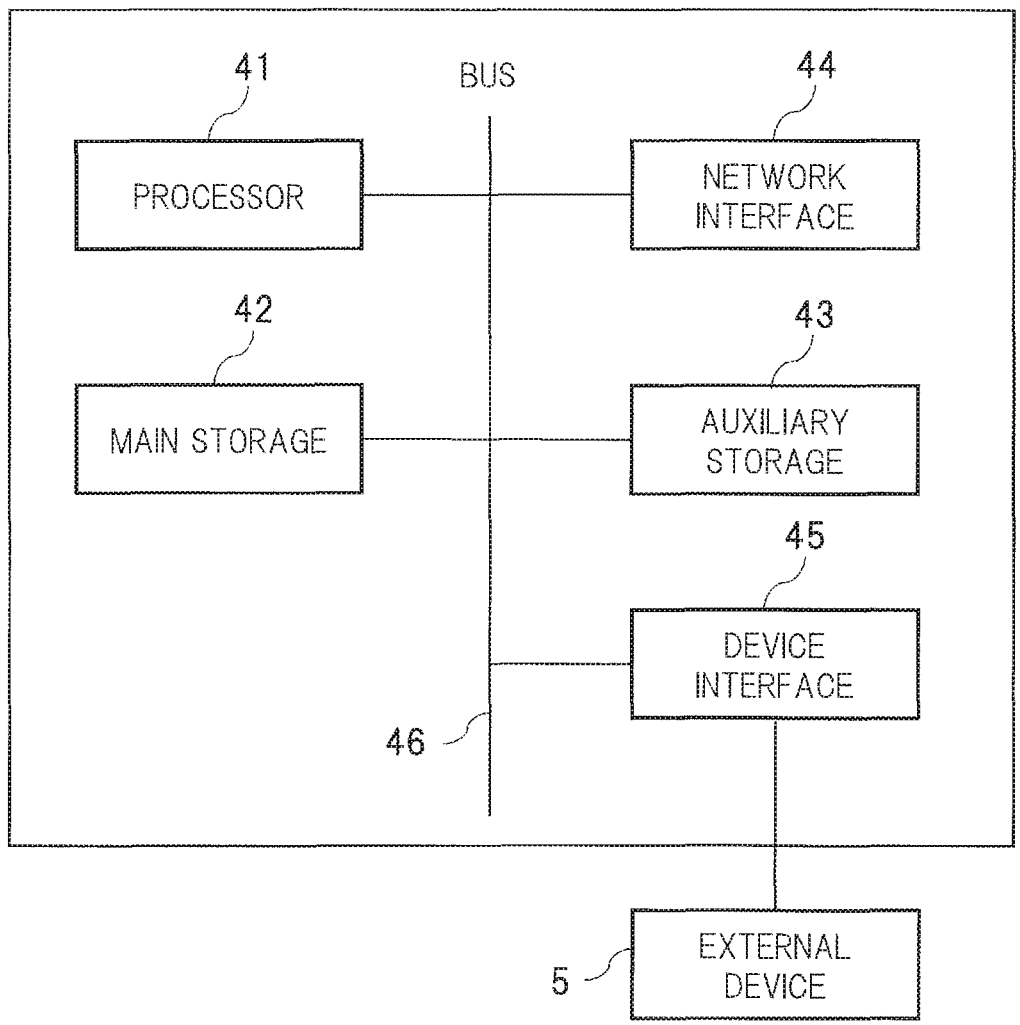
FIG. 8 is a block diagram showing an example of a hardware configuration according to an embodiment of the present invention.

FIG. 8 is a block diagram showing an example of a hardware configuration according to an embodiment of the present invention.

The radio-apparatus-disposition estimation device 1 can be realized as a computer device including a processor 41, a main storage 42, an auxiliary storage 43, a network interface 44, and a device interface 45, which are connected via a bus 46.

The processor 41 can realize the functions of the acquirer 11, the input section 12, the estimator 13, the determiner 14, the decider 15, the transmitter 16, and the output section 17 by reading out a program from the auxiliary storage 43, developing the program in the main storage 42, and executing the program.

The estimation device in this embodiment may be realized by installing, in advance, in the computer device, a program executed in the estimation device. Alternatively, the estimation device in this embodiment may be realized by installing, in the computer device, the program stored in a storage medium such as a CD-ROM or installing, in the device, the program distributed via a network, as appropriate.

The main storage 42 is a memory device that temporarily stores commands to be executed by the processor 41, various data, and the like. The main storage 42 may be a volatile memory such as a DRAM or a nonvolatile memory such as an MRAM. The auxiliary storage 43 is a storage device that permanently stores programs, data, and the like. As the auxiliary storage 43, there are an HDD, an SSD, or the like.

The network interface 44 is an interface for connecting the radio-apparatus-disposition estimation device 1 to a communication network. Communication with the radio apparatus 2 may be realized by the network interface 44. Only one network interface is shown. However, a plurality of network interfaces may be mounted.

The device interface 45 is an interface for connecting the radio-apparatus-disposition estimation device 1 to a device such as an external device 5. The input section 12 and the output section 17 may be connected to a device interface 45 as external devices.

The terms used in each embodiment should be interpreted broadly. For example, the term "processor" may encompass a general purpose processor, a central processor (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, at least one microprocessor in conjunction with a DSP core.

As another example, the term "storage" or "storage device" employed in the embodiment may encompass any electronic component which can store electronic information. The "storage" or "storage device" may refer to various types of media such as random access memory (RAM), read-only memory (ROM), programmable read-only memory (PROM), erasable programmable read only memory (EPROM), electrically erasable PROM (EEPROM), non-volatile random access memory (NVRAM), flash memory, magnetic such as an HDD, an optical disc or SSD.

It can be said that the storage electronically communicates with a processor if the processor read and/or write information for the storage. The storage may be integrated to a processor and also in this case, it can be said that the storage electronically communication with the processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A radio-apparatus-disposition estimation device comprising:
a processor configured to execute a program to provide at least:
a first acquirer to acquire first information concerning communication among a respective plurality of radio apparatuses or radio waves transmitted and received among the respective plurality of radio apparatuses;
a second acquirer to acquire setting position candidates which indicate respective places where the plurality of radio apparatuses are set; and
a calculator to calculate, on the basis of the first information and the setting position candidates, one or a plurality of estimated patterns each indicating a combination in which each one of the plurality of radio apparatuses corresponds to a respective one of the setting position candidates
wherein:
second information concerning a result of communication connection of a second radio apparatus, which is one of the plurality of radio apparatuses, to a first radio wave output by a first radio apparatus, which is one of the plurality of radio apparatuses, and third information concerning a result of communication connection of a third radio apparatus, which is one of the plurality of radio apparatuses, to the first radio wave are included in the first information, and
the calculator calculates the one or the plurality of estimated patterns on the basis of the setting position candidates, the second information, and the third information.

2. The radio-apparatus-disposition estimation device according to claim 1, wherein:
fourth information concerning a second radio wave, which enables communication connection to one of the plurality of radio apparatuses, and has a minimum output power value, among a plurality of output radio waves output by another one of the plurality of radio apparatuses, and fifth information concerning a third radio wave, which enables communication connection to yet another one of the plurality of radio apparatuses, and has a minimum output power value, among the plurality of output radio waves output by the another one of the plurality of radio apparatuses, are further included in the first information, and
the calculator calculates the one or the plurality of estimated patterns on the basis of the setting position candidates, the fourth information, and the fifth information.

3. The radio-apparatus-disposition estimation device according to claim 1, wherein:
the second acquirer further acquires radio wave propagation models related to the respective setting position candidates,
fourth information concerning output power of a second radio wave output by one of the plurality of radio apparatuses, and fifth information concerning received power of the second radio wave received by another one of the plurality of radio apparatuses that receives the second radio wave, are further included in the first information, and
the calculator estimates a distance between the one and the another one of the plurality of radio apparatuses on the basis of the fourth information, the fifth information, and the radio wave propagation models and calculates the one or the plurality of estimated patterns.

4. The radio-apparatus-disposition estimation device according to claim 3, wherein:
the calculator determines, on the basis of a given probability density distribution function, a random value included in the radio wave propagation models and estimates the distance between the one and the another one of the plurality of radio apparatuses on the basis of the fourth information, the fifth information, and the radio wave propagation models.

5. The radio-apparatus-disposition estimation device according to claim 1, wherein:
fourth information concerning a second radio wave output by one of the plurality of radio apparatuses, and fifth information concerning communication based on the second radio wave between the one of the plurality of radio apparatuses and another one of the plurality of radio apparatuses, are further included in the first information, and
the calculator calculates, on the basis of the setting position candidates, a plurality of hypothetical patterns formed by combinations of the radio apparatuses and the setting position candidates, calculates a likelihood of the fifth information on the basis of a probability function given in advance including, as arguments, the fourth information, the fifth information, and distances between the setting position candidates of the one of the plurality of radio apparatuses and the setting position candidates of the another one of the plurality of radio apparatuses in the hypothetical patterns, calculates a likelihood of the hypothetical patterns on the basis of the likelihood of the fifth information, and determines an estimated pattern on the basis of the likelihood of the hypothetical patterns.

6. The radio-apparatus-disposition estimation device according to claim 5, wherein:
the fourth information is an output power value of the second radio wave, and
the fifth information is a result of a communication connection between the one and the another one of the plurality of radio apparatuses.

7. The radio-apparatus-disposition estimation device according to claim 1, wherein:
fourth information concerning a second radio wave output by one of the plurality of radio apparatuses, and fifth information concerning the second radio wave received by another one of the plurality of radio apparatuses, are further included in the first information, and the calculator calculates a plurality of hypothetical patterns on the basis of the setting position candidates, calculates a likelihood of the fifth information on the basis of the fourth information, the fifth information, and distances between setting position candidates of the one of the plurality of radio apparatuses and setting position candidates of the another one of the plurality of radio apparatuses in the hypothetical patterns, calculates a likelihood of the hypothetical patterns on the basis of the likelihood of the fifth information, and determines an estimated pattern on the basis of the likelihood of the hypothetical patterns.

8. The radio-apparatus-disposition estimation device according to claim 7, wherein:

the fourth information is an output power value of the second radio wave, and the fifth information is a received power value of the second radio wave.

9. The radio-apparatus-disposition estimation device according to claim1, further comprising:

a decider to select three radio apparatuses out of the plurality of radio apparatuses and decide, on the basis of a given radio wave propagation model, an output power value of an output radio wave output from one of the three radio apparatuses such that communication connection to another one of the three radio apparatuses can be performed but the communication connection to the remaining one of the three radio apparatuses cannot be performed; and a transmitter to transmit the output power value to the one of the three radio apparatuses.

10. The radio-apparatus-disposition estimation device according to claim 1, further comprising:

a decider to decide an instruction to cause one of the plurality of radio apparatuses to increase an output power value until communication connection to another one of the plurality of radio apparatuses can be performed or to reduce the output power value until the communication connection to the another one of the plurality of radio apparatuses cannot be performed; and a transmitter to transmit the instruction to the one of the plurality of radio apparatuses.

11. An estimation method executed by a computer, the estimation method comprising:

acquiring first information concerning communication among a respective plurality of radio apparatuses or radio waves transmitted and received among the respective plurality of radio apparatuses;

acquiring setting position candidates which indicate respective places where any one of the plurality of radio apparatuses is set; and calculating one or a plurality of estimated patterns each indicating a combination in which each one of the plurality of radio apparatuses corresponds to a respective one of the setting position candidates wherein:

second information concerning a result of communication connection of a second radio apparatus, which is one of the plurality of radio apparatuses, to a first radio wave output by a first radio apparatus, which is one of the plurality of radio apparatuses, and third information concerning a result of communication connection of a third radio apparatus, which is one of the plurality of radio apparatuses, to the first radio wave are included in the first information, and the one or the plurality of estimated patterns are calculated on the basis of the setting position candidates, the second information, and the third information.

12. A non-transitory computer readable medium having a computer program stored therein which causes a computer, when executed by the computer, to perform processes comprising:

acquiring first information concerning communication among a respective plurality of radio apparatuses or radio waves transmitted and received among the respective plurality of radio apparatuses;

acquiring setting position candidates which indicate respective places where any one of the plurality of radio apparatuses is set; and calculating one or a plurality of estimated patterns each indicating a combination in which each one of the plurality of radio apparatuses corresponds to a respective one of the setting position candidates wherein:

second information concerning a result of communication connection of a second radio apparatus, which is one of the plurality of radio apparatuses, to a first radio wave output by a first radio apparatus, which is one of the plurality of radio apparatuses, and third information concerning a result of communication connection of a third radio apparatus, which is one of the plurality of radio apparatuses, to the first radio wave are included in the first information, and the one or the plurality of estimated patterns are calculated on the basis of the setting position candidates, the second information, and the third information.

* * * * *